United States Patent [19]

Kuczynski et al.

[11] 4,247,061
[45] Jan. 27, 1981

[54] HELICOPTER WITH STABILATOR DETUNED IN ANTISYMMETRIC VIBRATION MODES FROM MAIN ROTOR WAKE EXCITATION FREQUENCY

[75] Inventors: William A. Kuczynski, Branford, Conn.; John Marshall, II, deceased, late of Cheshire, Conn., by Ruth Ann D. Marshall, administratrix

[73] Assignee: United Technologies Corporation, Hartford, Conn.

[21] Appl. No.: 923,834

[22] Filed: Jul. 12, 1978

[51] Int. Cl.² .................. B64C 27/00; B64C 5/10
[52] U.S. Cl. .................... 244/17.19; 244/17.11; 244/87
[58] Field of Search ............. 244/17.11, 17.17, 17.19, 244/87, 17.13; 248/560, 562, 605, 636

[56] References Cited
U.S. PATENT DOCUMENTS

| | | | |
|---|---|---|---|
| 3,717,317 | 2/1973 | Certain | 244/17.19 |
| 4,103,848 | 8/1978 | Johnson et al. | 244/17.13 |

*Primary Examiner*—Barry L. Kelmachter
*Attorney, Agent, or Firm*—Vernon F. Hauschild

[57] ABSTRACT

A helicopter stabilator having naturally high response to the main rotor wake excitation frequency in roll and yaw stabilator vibratory modes is selectively mounted so as to be detuned therefrom in antisymmetric stabilator vibratory modes without adversely affecting symmetric stabilator vibratory modes, stabilator vertical stiffness, or stabilator pitch stiffness.

5 Claims, 10 Drawing Figures

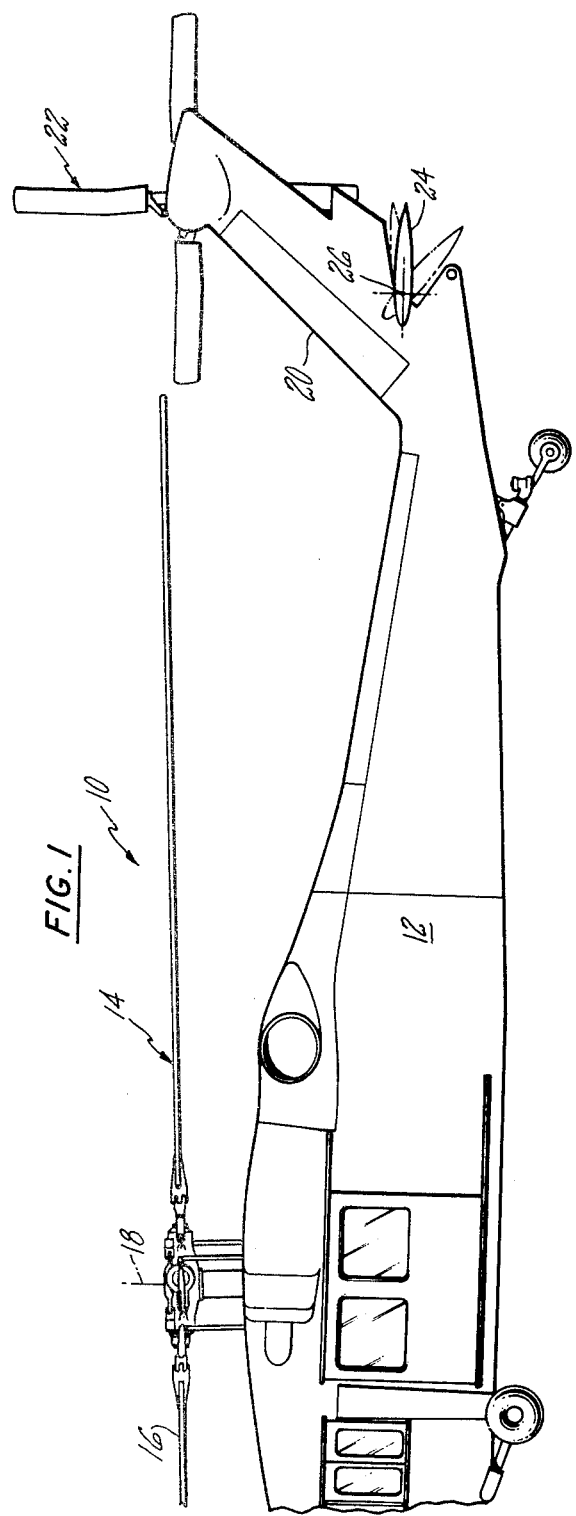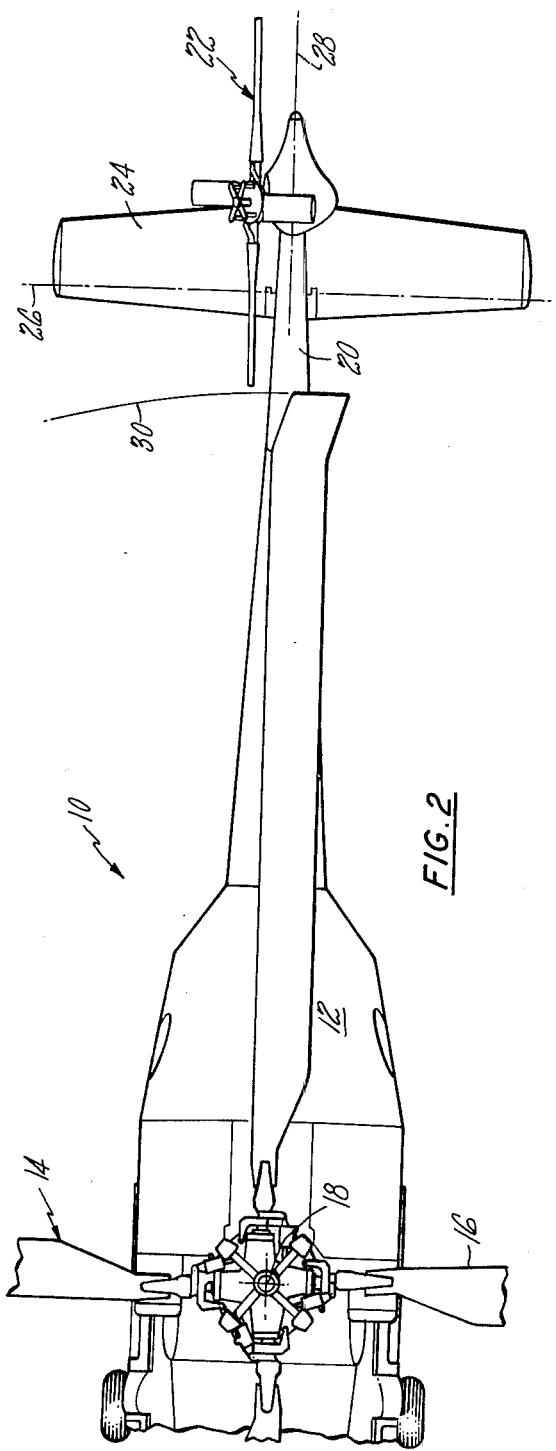

HELICOPTER WITH STABILATOR DETUNED IN ANTISYMMETRIC VIBRATION MODES FROM MAIN ROTOR WAKE EXCITATION FREQUENCY

The invention herein described was made in the course of or under a contract or sub-contract thereunder, with the Department of the Army.

BACKGROUND OF THE INVENTION

1. Field of the Invention

This invention relates to helicopter stabilators and more particularly to the mounting thereof so as to detune the stabilator roll and yaw vibration modes from troublesome vibration excitation forces, such as from the main rotor wake.

2. Description of the Prior Art

In the prior art, stabilators have conventionally been hard mounted through antifriction bearings. Tip weights or structural stiffness has been utilized to detune stabilator vibratory responses. Both of these methods add to the weight of the stabilator, and stabilator tip weights of sufficient mass to provide antisymmetric mode detuning also have an undesirable affect upon symmetric vibratory modes.

SUMMARY OF THE INVENTION

A primary object of the present invention is to provide a stabilator for a helicopter which is detuned in antisymmetric vibratory modes from a troublesome vibratory excitation frequency, such as main rotor wake, without affecting symmetric vibratory modes or vertical or pitch stiffness of the stabilator.

It is a further object of this invention to mount a helicopter stabilator so as to avoid resonance therein and hence reduce the loads which the stabilator imposes upon its mounting structure and the vibrations which such loads impart to the helicopter.

In accordance with the present invention, the stabilator is supported from the tail pylon by a three point suspension system utilizing two coaxial mounts positioned on opposite sides of the helicopter longitudinal axis to support the stabilator for pitch change motions with respect to the fuselage about a pitch change axis, and in which the third mount is positioned substantially midway between the first two mounts and longitudinally offset therefrom, and which third mount is attached to an actuator which produces controlled stabilator pitch change.

In accordance with the present invention, one of the stabilator pitch axis defining mounts and the third mount are of the antifriction variety, preferably a spherical bearing mount, and the third mount is an elastomer mount of selected stiffness to detune the stabilator roll and yaw natural frequency modes from the main rotor wake excitation frequency without affecting stabilator symmetric natural frequency modes, stabilator vertical stiffness, and stabilator pitch stiffness.

In accordance with a further feature of this invention, the elastomer mount detunes the stabilator by utilizing elastomer shear in directions normal to the stabilator pitch axis.

Other objects and advantages of the present invention may be seen by referring to the following description and claims, read in conjunction with the accompanying drawings.

BRIEF DESCRIPTION OF THE DRAWINGS

FIG. 1 is a side view of a helicopter utilizing a stabilator mounted according to our invention.

FIG. 2 is a top view corresponding to FIG. 1.

DESCRIPTION OF THE PREFERRED EMBODIMENT

Figure 3:
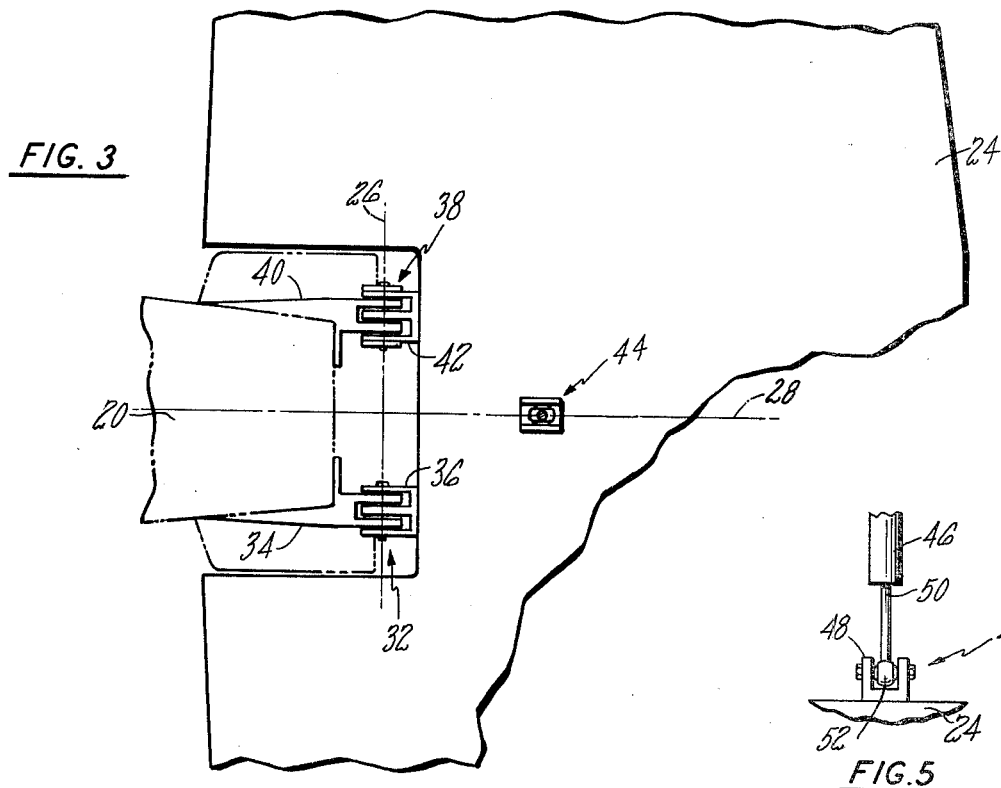
FIG. 3 is an enlarged showing of the mounting connection between the stabilator and the helicopter tail pylon.

Referring to FIGS. 1 and 2, we see helicopter 10 which includes fuselage 12, main lift rotor 14 with blades 16 thereof mounted for rotation about axis of rotation 18, tail pylon 20 which forms the after portion of fuselage 12 and supports tail rotor 22. Horizontal stabilator 24 is supported from tail pylon 20 for pivot motion about stabilator pitch axis 26. Stabilator 24 is of aerodynamic shape and projects laterally equidistant on opposite sides of fuselage longitudinal axis 28, although it could be offset from axis 28 and the opposite lateral sides of the stabilator 24 need not be identical.

The function of the stabilator is to provide aerodynamic control surfaces to assist in the flight controlling and manuevering of the helicopter.

It will be noted by viewing FIG. 2 that stabilator 24 presents a substantial surface area positioned approximately under the rotor disc 30, defined by the rotation of rotor blades 16, so that stabilator 24 is within the region of influence of the main rotor wake so that as each blade 16 passes over the stabilator 24, the wake therefrom imposes an aerodynamic load upon stabilator 24. The result of such rotor wake imposed force, whose frequency will be four per revolution (4/REV.) for the four-bladed helicopter shown, creates vibrations in the stabilator 24, which vibrations, in turn, impose forces upon the helicopter fuselage and thereby generate vibrations therein. Fuselage vibrations are highly undesirable both with respect to personnel and equipment. Further, if the rotor wake vibration excitation frequency, or any other excitation force, is sufficiently close to the natural frequency of the stabilator 24, the stabilator 24 could be brought into resonance so as to produce intolerable vibrations therein and possible destruction thereof.

For purposes of explanation, the rotor wake excitation force will be utilized to describe the vibrations excited in the stabilator, but it should be borne in mind that there are other stabilator vibration excitation forces as well.

By way of definition, stabilator vibrational modes which cause the opposite sides of the stabilator to move in opposite directions are called antisymmetric modes, while stabilator vibratory modes which cause the opposite sides of the stabilator to move in the same direction are called symmetric modes. The yaw mode of vibration which causes one side of the stabilator to move in a forward direction while the other side of the stabilator moves in an aft direction, the roll mode of vibration which causes one side of the stabilator to move vertically upward while the other side of the stabilator moves vertically downward, and the lateral mode of vibration which causes the whole stabilator to move laterally, are called stabilator antisymmetric modes of vibration of vibratory modes. The pitch mode of vibration, which causes the opposite sides of the stabilator to pitch up simultaneously, the vertical mode of vibration which causes the opposite sides of the stabilator to move vertically upward simultaneously, and the longitudinal mode of vibration which causes the opposite sides of the stabilator to move in a forward direction simultaneously, are called stabilator symmetric vibratory modes.

Due to its construction, the particular stabilator illustrated in FIGS. 1 and 2 has a natural frequency which caused the frequency of the stabilator symmetric vibratory modes to be sufficiently separated from the frequency of the excitation force (4/REV.) that stabilator resonance presented no problem. The frequency of the antisymmetric stabilator vibratory modes, in particular roll and yaw, however, were sufficiently close to the frequency of the main rotor wake excitation force that the stabilator was highly responsive in roll and yaw modes to the main rotor wake excitation frequency and therefore stabilator resonance problems were presented thereby.

We therefore found it necessary to isolate or detune the stabilator antisymmetric vibratory modes from the main rotor wake excitation frequency without disturbing the stabilator symmetric vibratory modes and without reducing stabilator vertical and pitch stiffness because reduction in either of these stiffnesses could cause the stabilator to move in response to rotor wake forces when such stabilator motion was not demanded by pilot control input.

Our first consideration was to the prospect of adding stiffness to the stabilator but in our particular stabilator, in view of the complexity of the attachment structure, this approach proved to be impractical. Our second approach was to consider reducing the mass of the stabilator, but we found this impossible to accomplish while retaining the required aerodynamic effectiveness of the stabilator. Our third approach was to add damping to the stabilator, but this approach was found to be impractical because it produced significant weight increases. Our fourth approach was to add mass to the stabilator, which would be in the form of conventional tip weights at opposite tips of the stabilator. We tried adding small masses as tip weights and determined that such small masses were not successful in avoiding the antisymmetric mode resonance problem. We then tried heavier masses as tip weights but found that a sufficiently heavy tip weight to avoid resonance in antisymmetric modes adversely affects symmetric mode response, thereby producing symmetric mode resonant problems which did not originally exist. Our fifth approach was to reduce stabilator stiffness. It was determined that general system stiffness reduction also created changes in the symmetric mode responses with the attendant threat of resonance. Finally, through analytical study and experimentation, we discovered the stabilator mounting system taught herein which produces a stabilator stiffness reduction which affects antisymmetric response and neither symmetric response nor stabilator vertical or pitch stiffness.

Figure 5:
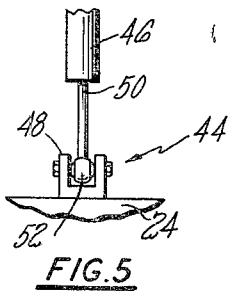
FIG. 5 is a rear view of a portion of the FIG. 4 construction.
Figure 4:
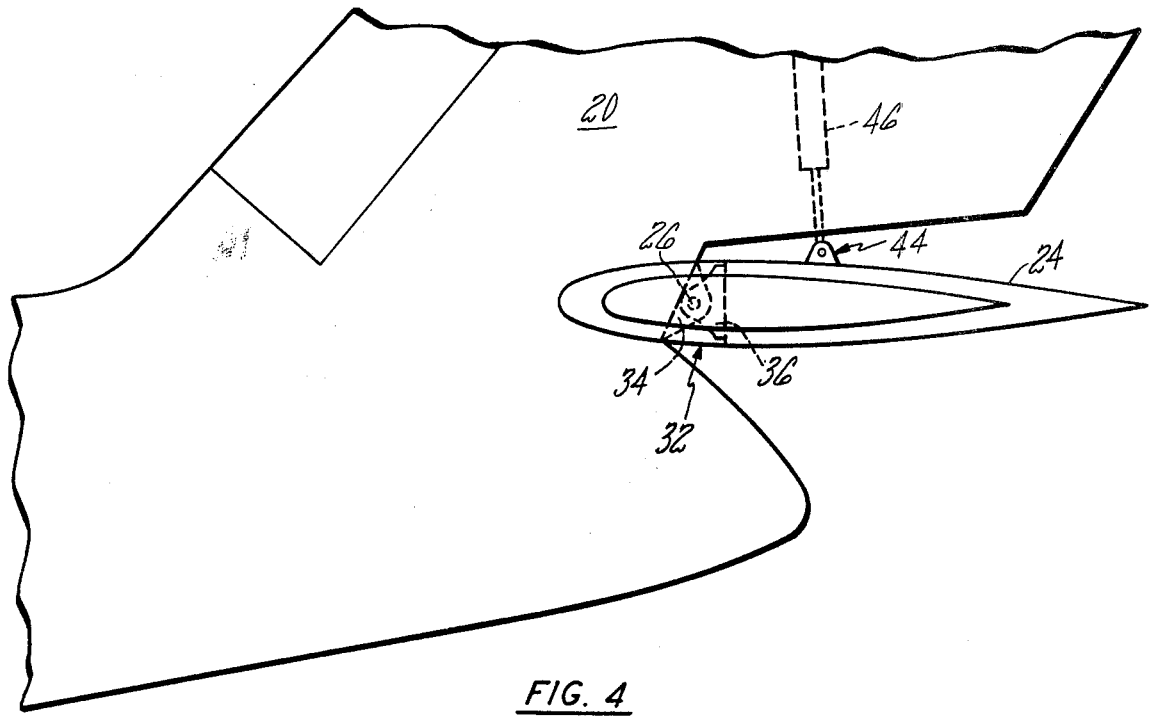
FIG. 4 is an enlarged side view corresponding to FIG. 3.

Our solution to this problem was to mount the stabilator from the helicopter tail pylon utilizing a three point suspension system. The system comprised of two mounts positioned equidistant on opposite sides of the center of the stabilator, and preferably the fuselage longitudinal axis 28, which mounts are coaxial and support the stabilator 24 from tail pylon 20 for pitch change motion about axis 26. These two mounts are best shown in FIG. 3 in which first mount 32 is formed between pylon fitting 34 and stabilator fitting 36, while second mount 38 is formed between pylon fitting 40 and stabilator fitting 42. The third mount 44 is preferably laterally midway between first and second mounts 32 and 38 and on longitudinal axis 28 and is longitudinally spaced from mount 32 and 38 to provide the three point support system. Stabilator pitch change actuator 46, which is pilot or electronically controlled, is connected to mount 44 as best shown in FIG. 5 and is actuatable to cause stabilator 24 to pivot about pitch change axis 26 under the control of the pilot or electronic control system to selectively control helicopter flight. As shown in FIG. 5, the third mount 44 is preferably a spherical bearing of the type shown and described in greater detail in FIG. 6. Third mount 44 is preferably an antifriction mount of the spherical mount variety as illustrated in FIG. 5, wherein stabilator fitting 48 is connected to actuator rod 50 through spherical rod end bearing 52.

Figure 6:
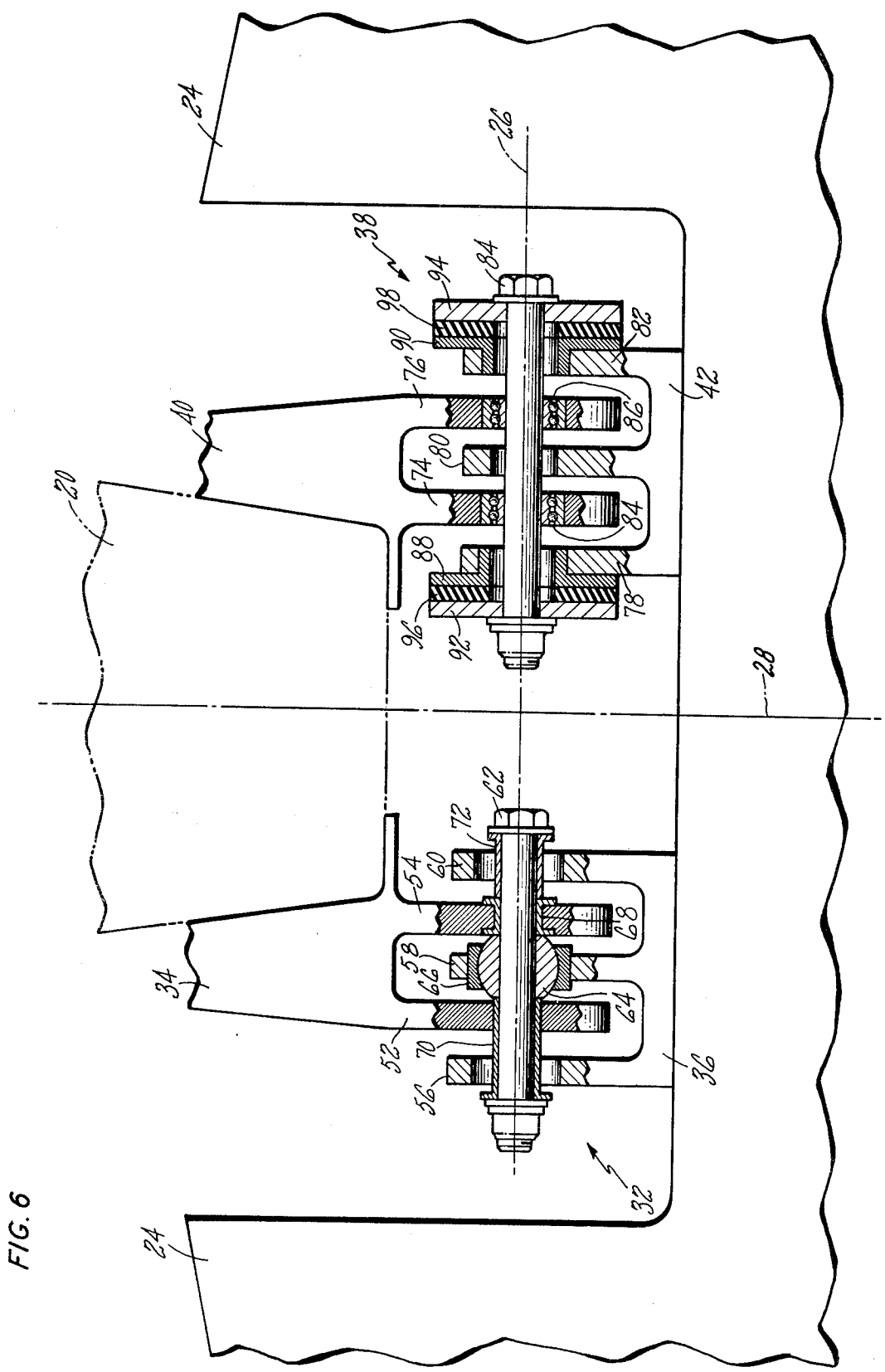
FIG. 6 is a cross-sectional showing of the hard mount connection and the elastomer mount connection between the tail pylon and the stabilator defining the pitch change axis thereof.

Referring to FIG. 6, we see that hard point or fixed mount 32 includes laterally spaced ears 52 and 54 from pylon fitting 34 interleaved with laterally spaced ears 56, 58 and 60 from stabilator fitting 36, which ears have aligned holes passing therethrough. Bolt member 62 extends through the aligned holes and is concentric about pitch change axis 26. Spherical bearing inner race 64 is received as a tight fit on bolt 62, while spherical bearing outer race 66 is received as a tight fit in the aperture of stabilator fitting ear 58. Shoulder bushing 68 envelops bolt 62 and engages the opposite surface of pylon ear 54. Sleeve members 70 and 72 extend on opposite sides of the spherical bearing 64–66 and shoulder bushing 68 to engage the opposite ends of bolt member 62. It will be noted that clearance is provided between the aperture of ears 56 and 60 and bushings 70 and 72 to permit pivot motion of the stabilator about the spherical bearing 64–66. These clearances also permit ears 56 and 60 to serve as redundant, catch fittings in case of failure.

Still referring to FIG. 6, we see second mount 38, which is elastomer in nature, and which includes laterally spaced ears 74 and 76 of pylon fitting 40 interleaved with laterally spaced ears 78, 80 and 82 of stabilator fitting 42. Ears 74–82 have aligned apertures so that bolt member 84 passes therethrough concentrically about pitch change axis 26. Bolt member 84 is supported in ears 74 and 76 by ball bearings 84 and 86. Outboard ears 78 and 82 receive inner races 88 and 90, while in the apertures thereof, while outer races 92 and 94 abut the outer protrusions of bolt member 84. Elastomer layers 96 and 98 are sandwiched between their respective inner and outer races and bonded thereto and are of selected material and thickness so as to establish the stiffness of elastomeric mount 38. Deflection permitting clearances are shown to exist between bolt member 84 and inner races 88 and 90, and stabilator fitting ear 80. These clearances also serve as redundant, catch fittings in case of failure.

It is important to note that in the construction of isolator mount 38, that the elastomer layers 96 and 98 extend in the direction perpendicular to pitch change axis 26 and parallel to axis 18 so that mount 38 has controlled softness in that direction. It is also important to note that elastomer 96 is loaded in shear by relative motion between the stabilator and the tail pylon and this is advantageous because elastomer is capable of withstanding substantially greater deflection in shear than in compression. Elastomer layers 96 and 98 are preferably made of natural rubber or other material of suitable longevity in the helicopter operating environment.

In arriving at the construction shown as isolator mount 38 in FIG. 6, we first positioned an elastomer bushing between bolt member 84 and ear 80, and thereafter fitted two elastomer bushings between bolt member 84 and outer ears 78 and 82, but in each instance, since the elastomer was being loaded in compression, it was not capable of accommodating the required deflections and therefore was not acceptable.

Figure 7A:
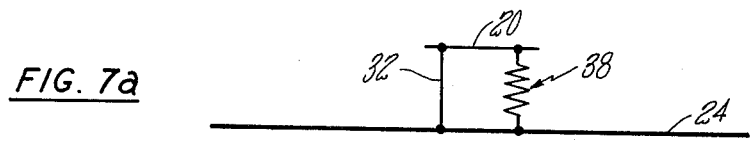
FIGS. 7a, 7b, and 7c are schemmatic presentations of the effect of our stabilator mounting system upon stabilator antisymmetric vibratory modes and stabilator symmetric vibratory modes.
Figure 7B:
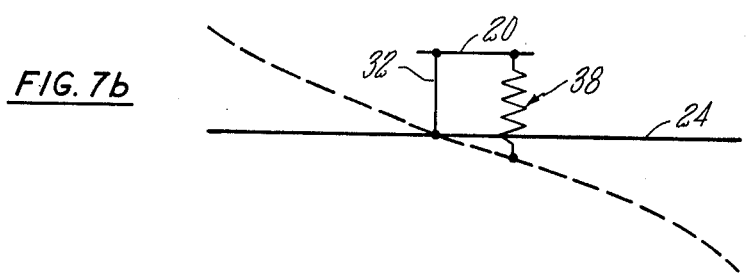
Figure 7C:
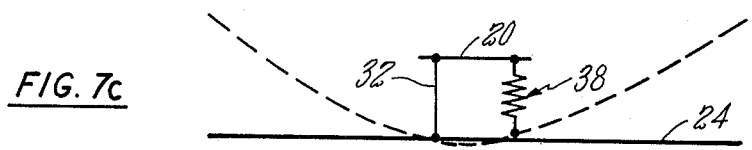

The advantage of the mount constructions shown in FIG. 6 is best illustrated by viewing FIGS. 7a, 7b and 7c. FIG. 7a merely shows stabilator 24 supported from the tail pylon 20 by fixed and rigid mount 32 and elastomer mount 38, as in FIG. 6. As best shown in FIG. 7b, the elastomer mount has substantial affect upon and therefore substantial capability to detune stabilator antisymmetric vibrational modes. By viewing FIG. 7c, it will be seen that isolator 38 has virtually no affect upon stabilator symmetric vibrational modes.

Figure 8:
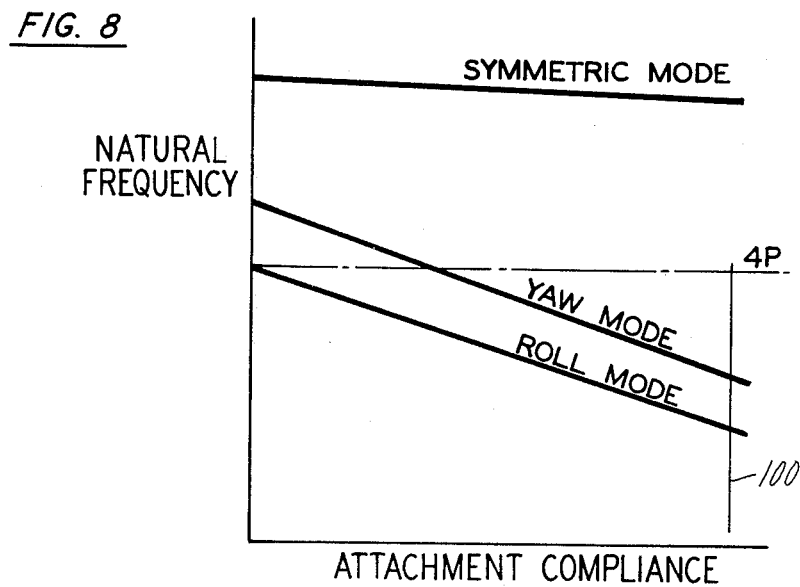
FIG. 8 is a graph illustrating the separation between the frequency of a stabilator excitation force and the stabilator symmetric natural frequency modes, the stabilator yaw natural frequency mode, and the stabilator roll natural frequency mode.

The advantage of our mounting system is further illustrated in FIG. 8 which shows that the stabilator symmetric vibration load frequency is substantially displaced from the four per rev rotor wake excitation frequency to avoid resonance. FIG. 8 further shows that by proper selection of the elastomer members 96 and 98 in elastomer mount 38, the compliance or stiffness of the mount 38 may be selected, for example, along line 100, so that the natural frequencies of the stabilator yaw and roll vibrational modes are also safely displaced from the excitation frequency.

Again, referring to FIG. 6, the operation of and cooperation between first and second mount 32 and 38 can best be appreciated by considering how these mounts act and coact to react stabilator loads. Vertical loads on the stabilator are passed through the spherical bearing 64-66 of mount 32 and through bolt 62 and ears 52 and 54 into pylon fitting 34 and then into pylon 20. Right-hand lateral loads on the stabilator are reacted through the spherical bearing and then the shoulder bushing 68 of mount 32, and then into ear 54 of pylon fitting 34 and then into the pylon. Left-hand lateral loads on the stabilator are reacted through the spherical bearing 64-66 in mount 32 and bushing 70 into the left-hand end of bolt member 62 and then through bolt 62 into the shoulder bushing 68 and from there, as before, into the tail pylon. Longitudinal stabilator loads are reacted in identical fashion to vertical stabilator loads as described above. Because of the presence of the spherical bearing 64-66 in mount 32, no moment loads are reacted by this hard point fixed mount 32.

Now considering isolator or elastomer mount 38, vertical loads are reacted through the stabilator fitting outer ears 78 and 82 through a press fit and bond into the inner races 88 and 90, and then in shear through the elastomer layers 96 and 98 to the outer races 92 and 94, then into bolt member 84 and into ball bearings 84 and 86 and then into the pylon fitting ears 74 and 76, into pylon fitting 40 and then pylon 20. Longitudinal stabilator loads are reacted in the same fashion. It is important to note that no lateral stabilator loads are reacted in the elastomer mount 32 since there are no elements such as shoulder bushing on bolt member 84. Accordingly, all lateral loads are reacted by the hard point mount 32. Stabilator roll and yaw moment loads cause pivoting of the stabilator about the spherical bearing 64-66 of the hard point connector 32 and are reacted by a couple between the vertical and longitudinal loads of hard point fixed mount 32 and elastomer mount 38, as well as by differential shear between the elastomer layers 96 and 98 at the opposite ends of mount 38. Elastomeric layers 96 and 98, and their associated parts, may be spherical in shape about the center of bearing 64. No pitching moments are reacted in mounts 32 and 38 because of the presence of the spherical bearing 64-66 in the hard mount 32 and the ball bearings 84 and 86 in the isolator mount 38. Pitching moments about pitch change axis 26 on the stabilator are reacted by a couple consisting of vertical loads at actuator 46 and at pitch change axis 26.

An important advantage of our FIG. 6 mount system is that it not only detunes the stabilator antisymmetric vibrational modes from the excitation frequency but also substantially reduces the vibratory moment imposed by the stabilator on the tail pylon from that so imparted by the prior art constructions.

We wish it to be understood that we do not desire to be limited to the exact details of construction shown and described, for obvious modifications will occur to a person skilled in the art.

We claim:

1. A helicopter having:
  (A) a fuselage having a longitudinal axis,
  (B) a main lift rotor supported from said fuselage and having
    (1) rotor blades supported to rotate about an axis of rotation,
  (C) a tail section forming the after portion of said fuselage, and
  (D) an airfoil shaped, horizontal stabilator extending substantially perpendicular to said longitudinal axis and positioned to intercept main rotor blade wakes to thereby establish symmetric and antisymmetric vibration modes in said stabilator, and
  (E) means to support said stabilator from said tail section to be pivotable about a pitch change axis substantially perpendicular to said longitudinal axis and to detune one of said stabilator vibration modes from the main rotor wake excitation frequency,
  (F) wherein said support means is constructed to detune said stabilator antisymmetric vibration modes from the main rotor wake excitation frequency,
  (G) wherein said support means is constructed to have minimal effect upon stabilator symmetric vibration modes,
  (H) wherein said support means is constructed to have minimal effect on stabilator vertical and pitch stiffness,
  (I) wherein said stabilator support means is a three point suspension system supporting the stabilator from the tail section and including a first and a second mounting member between the stabilator and the tail section positioned on opposite sides of the longitudinal axis and enveloping the stabilator pitch change axis so as to support the stabilator for pivotable motion with respect to the tail section about the stabilator pitch change axis, and including a third mounting member displaced longitudinally from said first and second mounting members, and (J) wherein said first and third mounting members are hard mounted, annular, antifriction bearings and wherein said third mounting member is actuatable so as to cause said stabilator to pivot about the stabilator pitch axis, and wherein said second mounting member is an annular elastomer bearing of selected stiffness to detune the stabilator antisymmetric vibration modes and thereby provide sufficient separation between the frequency thereof and the main rotor wake excitation frequency so as to avoid stabilator resonance.

2. A helicopter according to claim 1 wherein said first and third members are hard mounted spherical bearings and wherein said second mounting member includes:

(A) fitting members connected to and projecting from said tail section and said stabilator and having,
  (1) interleaved, laterally spaced, and longitudinally overlapping ear members having laterally aligned holes therethrough, and with two ear members from one of said fitting members constituting outer ear members,
(b) a bolt member passing through said aligned holes and connected to at least one ear member of one of said fitting members by antifriction bearings positioned between the aligned hole of the ear member and the bolt shaft,
(C) inner race members engaging the outer ear members,
(D) outer race members supported by and at opposite ends of said bolt member,
(E) a layer of elastomer of selected stiffness positioned between said inner and outer race members so as to form a vibration isolator between the stabilator and the tail section.

3. A helicopter according to claim 2 and wherein said inner and outer race members form a pair of races located at opposite ends of said bolt member, and wherein said pair of races define annular spaces therebetween extending perpendicular to the stabilator pitch axis, and wherein a layer of elastomer is positioned in each of said annular spaces and bonded to said races so as to react relative motion between the stabilator and tail section perpendicular to the pitch axis in elastomer shear.

4. A helicopter according to claim 3 wherein said first mounting member includes interleaved, laterally spaced, and longitudinally overlapping ear members extending from said stabilator and said tail section and having laterally aligned holes extending therethrough, a bolt member passing through said aligned holes and connected to one of said ear member by said spherical bearing of said first mounting member and connected to an adjacent one of said ear members by a shoulder bushing, and remaining aligned holes and said first mounting member bolt member shaped to define lateral clearance therebetween to permit pivot motion of the stabilator about the spherical bearing.

5. A helicopter according to claim 3 wherein said first and second mounting members are shaped and mounted to cooperate to permit pitch change motion of said stabilator with respect to said tail section, wherein said first member reacts all stabilator lateral loads, wherein the stabilator vertical and longitudinal loads are reacted jointly by said first and second mounting members including shear loading of the elastomer layers, and wherein moment loads on the stabilator cause stabilator pivot motion about the first mount spherical bearing and are reacted by a couple between said first and second mounting members and by differential shear in the elastomer layers.

* * * * *